(12) United States Patent
Wiesner et al.

(10) Patent No.: US 9,931,789 B2
(45) Date of Patent: Apr. 3, 2018

(54) METHOD AND APPARATUS FOR PRODUCING A LARGE THREE-DIMENSIONAL WORK PIECE

(71) Applicant: SLM Solutions GmbH, Luebeck (DE)

(72) Inventors: Andreas Wiesner, Luebeck (DE); Henner Schoeneborn, Luebeck (DE); Dieter Schwarze, Luebeck (DE)

(73) Assignee: SLM Solutions Group AG, Luebeck (DE)

( * ) Notice: Subject to any disclaimer, the term of this patent is extended or adjusted under 35 U.S.C. 154(b) by 609 days.

(21) Appl. No.: 14/515,259

(22) Filed: Oct. 15, 2014

(65) Prior Publication Data
US 2015/0174823 A1   Jun. 25, 2015

(30) Foreign Application Priority Data
Oct. 15, 2013   (EP) .................................... 13188704

(51) Int. Cl.
*B29C 67/00* (2017.01)
*B22F 3/105* (2006.01)
(Continued)

(52) U.S. Cl.
CPC ........ *B29C 67/0077* (2013.01); *B22F 3/1055* (2013.01); *B29C 64/153* (2017.08);
(Continued)

(58) Field of Classification Search
CPC .................................................. B29C 67/077
See application file for complete search history.

(56) References Cited

U.S. PATENT DOCUMENTS

| 2012/0251378 A1 | 10/2012 | Abe et al. |
| 2013/0055568 A1 | 3/2013 | Dusel et al. |

(Continued)

FOREIGN PATENT DOCUMENTS

| DE | 102006014835 | 10/2007 |
| EP | 1793979 | 6/2007 |

(Continued)

OTHER PUBLICATIONS

European Patent Office Official Action dated Dec. 1, 2017 in counter-part EP Patent Application No. 13188704.4 (9 pages).

*Primary Examiner* — Ryan Ochylski
(74) *Attorney, Agent, or Firm* — Taft Stettinius & Hollister LLP (57) ABSTRACT

Method and apparatus for producing a large three-dimensional work piece. In a method for producing a three-dimensional work piece, a layer of raw material powder is applied onto a carrier (16) accommodated within a process chamber (12) by means of a powder application device (14), wherein a plurality of irradiation areas (18a, 18b, 18c, 18d) is defined on a surface of the carrier (16). Electromagnetic or particle radiation is selectively irradiated onto the raw material powder applied onto the carrier (16) by means of an irradiation system (20), the irradiation system (20) comprising a plurality of irradiation units (22), each irradiation unit (22) being associated with one of the irradiation areas (18a, 18b, 18c, 18d) defined on the surface of the carrier (16) and being configured to selectively irradiate electromagnetic or particle radiation onto the raw material powder applied onto the associated irradiation area (18a, 18b, 18c, 18d). Fresh gas is supplied to the process chamber (12) by means of a gas inlet system (30), and gas containing particulate impurities is discharged from the process chamber (12) by means of a gas outlet system (32) such that a gas flow pattern is generated within the process chamber, the gas flow pattern (Continued)

being configured such that each irradiation area (18*a*, 18*b*, 18*c*, 18*d*) defined on the surface of the carrier (16) is overflown with fresh gas which is supplied to the process chamber (12) via the gas inlet system (30) and which, after having overflown the irradiation area (18*a*, 18*b*, 18*c*, 18*d*), is discharged from the process chamber (12) as gas containing particulate impurities via the gas outlet system (32).

14 Claims, 4 Drawing Sheets

(51) Int. Cl.
    *B29C 64/153*     (2017.01)
    *B33Y 10/00*     (2015.01)
    *B33Y 30/00*     (2015.01)
    *B33Y 40/00*     (2015.01)
    *B29L 9/00*     (2006.01)

(52) U.S. Cl.
    CPC ... *B22F 2003/1056* (2013.01); *B29L 2009/00* (2013.01); *B33Y 10/00* (2014.12); *B33Y 30/00* (2014.12); *B33Y 40/00* (2014.12); *Y02P 10/295* (2015.11)

(56) References Cited

U.S. PATENT DOCUMENTS

| | | |
|---|---|---|
| 2013/0112672 A1 | 5/2013 | Keremes et al. |
| 2014/0227123 A1 | 8/2014 | Gunster et al. |
| 2014/0349132 A1 | 11/2014 | Uhlmann et al. |

FOREIGN PATENT DOCUMENTS

| | | |
|---|---|---|
| EP | 2492084 A1 | 8/2012 |
| WO | 9208592 | 5/1992 |
| WO | 2012164078 | 12/2012 |
| WO | 2013092123 | 6/2013 |

METHOD AND APPARATUS FOR PRODUCING A LARGE THREE-DIMENSIONAL WORK PIECE

FIELD OF THE INVENTION

The present invention relates to a method and an apparatus for producing a large three-dimensional work piece by irradiating layers of a raw material powder with electromagnetic or particle radiation.

BACKGROUND

Selective laser melting or laser sintering is an additive layering process by which pulverulent, in particular metallic and/or ceramic raw materials can be processed to three-dimensional work pieces of complex shapes. To that end, a raw material powder layer is applied onto a carrier and subjected to laser radiation in a site selective manner in dependence on the desired geometry of the work piece that is to be produced. The laser radiation penetrating into the powder layer causes heating and consequently melting or sintering of the raw material powder particles. Further raw material powder layers are then applied successively to the layer on the carrier that has already been subjected to laser treatment, until the work piece has the desired shape and size. Selective laser melting or laser sintering can be used in particular for the production of prototypes, tools, replacement parts or medical prostheses, such as, for example, dental or orthopaedic prostheses, on the basis of CAD data.

An apparatus for producing moulded bodies from pulverulent raw materials by selective laser melting is described, for example, in EP 1 793 979 A1. The prior art apparatus comprises a process chamber which accommodates a plurality of carriers for the shaped bodies to be manufactured. A powder layer preparation system comprises a powder reservoir holder that can be moved to and fro across the carriers in order to apply a raw material powder to be irradiated with a laser beam onto the carriers. The process chamber is connected to a protective gas circuit comprising a supply line via which a protective gas may be supplied to the process chamber in order to establish a protective gas atmosphere within the process chamber. The protective gas circuit further comprises a discharge line via which protective gas containing particulate impurities such as, for example, residual raw material powder particles and welding smoke particles may be withdrawn from the process chamber.

SUMMARY

The invention is directed at the object of providing a method and an apparatus, which allow the production of a large high-quality three-dimensional work piece by irradiating layers of a raw material powder with electromagnetic or particle radiation.

This object is addressed by a method as defined in claim 1 and an apparatus as defined in claim 8.

In a method for producing a three-dimensional work piece, a layer of raw material powder is applied onto a carrier accommodated within a process chamber by means of a powder application device. The raw material powder preferably is a metallic powder, in particular a metal alloy powder, but may also be a ceramic powder or a powder containing different materials. The powder may have any suitable particle size or particle size distribution. It is, however, preferable to process powders of particle sizes <100 m. The process chamber may be sealable against the ambient atmosphere, i.e. against the environment surrounding the process chamber, in order to be able to maintain a controlled atmosphere, in particular an inert atmosphere within the process chamber. By controlling the atmosphere within the process chamber, the occurrence of undesired chemical reactions, in particular oxidation reactions, upon irradiating the raw material powder with electromagnetic or particle radiation can be prevented.

The carrier disposed in the process chamber may be a rigidly fixed carrier. Preferably, however, the carrier is designed to be displaceable in vertical direction so that, with increasing construction height of a work piece, as it is built up in layers from the raw material powder, the carrier can be moved downwards in the vertical direction. A plurality of irradiation areas is defined on a surface of the carrier. For example, four irradiation areas may be defined on the surface of the carrier and may be shaped and arranged so as to form four square or rectangular quadrants.

The raw material powder applied onto the carrier is selectively irradiated with electromagnetic or particle radiation by means of an irradiation system. In particular, the raw material powder applied onto the carrier may be subjected to electromagnetic or particle radiation in a site-selective manner in dependence on the desired geometry of the work piece that is to be produced. The irradiation system preferably is adapted to irradiate radiation onto the raw material powder which causes a site-selective melting of the raw material powder particles. The irradiation system comprises a plurality of irradiation units, wherein each irradiation unit is associated with one of the irradiation areas defined on the surface of the carrier and is configured to selectively irradiate electromagnetic or particle radiation onto the raw material powder applied onto the associated irradiation area.

Each irradiation unit may comprise a radiation beam source, in particular a laser beam source. It is, however, also conceivable that plural irradiation units are associated with a single radiation beam source, wherein a radiation beam provided by the single radiation beam source, by suitable means such as, for example, beam splitters and/or mirrors, may be split and/or deflected as required so as to direct the radiation beam provided by the radiation beam source to the associated irradiation units. Further, each irradiation unit may comprise at least one optical unit for guiding and/or processing a radiation beam emitted by the radiation beam source and supplied to the irradiation unit. The optical unit may comprise optical elements such an object lens, in particular an f-theta lens, and a scanner unit, the scanner unit preferably comprising a diffractive optical element and a deflection mirror.

Each irradiation unit may be controlled such that the radiation beam emitted by the radiation beam source and supplied to the irradiation unit, by the irradiation unit, is irradiated onto the raw material powder applied onto the irradiation area associated with the irradiation unit in a site selective manner and independent of the irradiation of other irradiation areas not associated with the irradiation unit in question. In other words, each irradiation area defined on the carrier may be individually and independently irradiated using a desired irradiation pattern. For example, if desired, a small sized three-dimensional work piece may be built-up in a single irradiation area by selectively irradiating the single irradiation area with electromagnetic or particle radiation by means of the irradiation unit associated with the irradiation area. Preferably, however, plural irradiation areas defined on the carrier are simultaneously irradiated with electromagnetic or particle radiation by suitable controlling the irradiation units associated with the irradiation areas thus allowing a large three-dimensional work piece to be built-up in an additive layer construction process within a relatively short time and thus at reasonable costs.

Fresh gas is supplied to the process chamber by means of a gas inlet system. The fresh gas supplied to the process chamber preferably is an inert gas such as, for example, Argon, Nitrogen or the like. It is, however, also conceivable to supply the process chamber with air. The fresh gas may be supplied to the process chamber by means of a suitable conveying device such as, for example, a pump or a blower. Further, the gas inlet system may comprise at least one nozzle via which the fresh gas may be supplied to the process chamber. The gas supply nozzle preferably is designed, i.e. shaped, dimensioned and arranged such that it does not extend into a beam path of a radiation beam emitted by the irradiation system, in particular when the radition beam is guided over the raw material powder applied onto the irradiation areas defined on the surface of the carrier.

Further, gas containing particulate impurities is discharged from the process chamber by means of a gas outlet system. While the raw material powder applied onto the carrier is selectively irradiated with electromagnetic or particle radiation, the fresh gas supplied to the process chamber by means of the gas inlet system, upon flowing through the process chamber, is increasingly loaded with particulate impurities such as, for example, raw material powder particles or welding smoke particles and finally exits the process chamber via the gas outlet system as gas containing particulate impurities. Hence, particulate impurities generated in the process chamber upon irradiating the raw material powder on the carrier with electromagnetic or particle radiation are purged from the process chamber by the gas flow guided through the process chamber by means of the gas inlet system and the gas outlet system. By removing particulate impurities from the process chamber, excessive absorption of radiation energy and/or shielding of the radiation beams emitted by the irradiation units of the irradiation system may be avoided.

The gas containing particulate impurities may be discharged from the process chamber by means of a suitable conveying device such as, for example, a pump or a blower. Further, the gas outlet system may comprise at least one nozzle via which the gas containing particulate impurities may be discharged from the process chamber. The nozzle preferably is designed, i.e. shaped, dimensioned and arranged such that it does not extend into a beam path of a radiation beam emitted by the irradiation system, in particular when the radition beam is guided over the raw material powder applied onto the irradiation areas defined on the surface of the carrier.

By the supply of fresh gas to the process chamber and/or the discharge of gas containing particulate impurities from the process chamber, a gas flow pattern is generated within the process chamber, the gas flow pattern being configured such that each irradiation area defined on the surface of the carrier is overflown with fresh gas which is supplied to the process chamber via the gas inlet system and which, after having overflown the irradiation area, is discharged from the process chamber as gas containing particulate impurities via the gas outlet system. In other words, in the method for producing a three-dimensional work piece, each irradiation area defined on the surface of the carrier is supplied with fresh purge gas which, prior to overflowing the irradiation area, does not overflow another irradiation area defined on the surface of the carrier. Further, gas, after having overflown one of the irradiation areas defined on the surface of the carrier and hence being loaded with particulate impurities generated upon irradiating the raw material powder applied onto the irradiation area with electromagnetic or particle radiation, is discharged from the process chamber via the gas outlet system without overflowing another irradiation area defined on the surface of the carrier.

In the context of the present application, the term "overflow" should be interpreted in a direction independent manner. In particular, the fresh gas supplied to the process chamber via the gas inlet system may overflow an irradiation area defined on the surface of the carrier in a direction substantially parallel to a surface of the raw material powder layer applied onto the irradiation area or in a direction which is inclined relative to the surface of the raw material powder layer applied onto the irradiation area. Specifically, the fresh gas supplied to the process chamber via the gas inlet system may overflow an irradiation area defined on the surface of the carrier also in a direction substantially perpendicular to a surface of the raw material powder layer applied onto the irradiation area.

By controlling the gas flow pattern generated within the process chamber in such a manner that fresh gas supplied to the process chamber does not overflow more than one of the irradiation areas defined on the surface of the carrier, particulate impurities generated upon irradiating the raw material powder applied onto the carrier with electromagnetic or particle radiation can be reliably removed from each one of the irradiation areas defined on the surface of the carrier. Hence, similar process conditions can be realized in all irradiation areas. In particular, excessive absorption of radiation energy and/or shielding of the radiation beam emitted by the irradiation units of the irradiation system may be avoided in all irradiation areas allowing the built-up of a large three-dimensional work piece with a high and consistent quality.

At least one overlapping area may be defined on the surface of the carrier. Raw material powder applied onto the overlapping area may be selectively irradiatable with electromagnetic or particle radiation by at least two irradiation units of the irradiation system. By defining suitable overlapping areas on the surface of the carrier, areas of a large three-dimensional work piece to be built-up on the carrier, which are disposed in adjoining regions of adjacent irradiation areas may be generated with the desired reliability and high quality. The raw material powder applied onto the carrier in the overlapping area in fact may be irradiated by more than one irradiation unit of the irradiation system, either simultaneously or successively. It is, however, also conceivable to select only one of the possible at least two irradiation units of the irradiation system for selectively irradiating the raw material powder applied onto the overlapping area so as to generate an area of a large three-dimensional work piece, which is disposed in an adjoining region of adjacent irradiation areas.

In case four irradiation areas, which are shaped and arranged so as to form four square or rectangular quadrants, are defined on the surface of the carrier, four stripe-shaped overlapping areas defining a cross-pattern on the surface of the carrier may be present, each overlapping area being selectively irradiatable with electromagnetic or particle radiation by two irradiation units of the irradiation system. A further overlapping area may be defined in a central region of the carrier which may be selectively irradiatable with electromagnetic or particle radiation by four irradiation units of the irradiation system.

Fresh gas may be supplied to the process chamber via a gas inlet system comprising a first gas inlet and a second gas inlet. The first and the second gas inlet of the gas inlet system may be arranged at opposing sides, i.e. in opposing side walls of the process chamber. Fresh gas may exit the first and the second gas inlet substantially parallel to the surface of the carrier and thus a surface of the raw material powder layer applied onto the carrier and, after exiting the first and the second gas inlet, may flow through the process chamber in a direction substantially parallel to the surface of the carrier and thus the surface of the raw material powder layer applied onto the carrier.

Further, fresh gas introduced into the process chamber via the first gas inlet may flow through the process chamber substantially parallel to the surface of the carrier and thus the surface of the raw material powder layer applied onto the carrier from the side wall of the process chamber wherein the first gas inlet is provided in the direction of a central region of the process chamber. Similarly, fresh gas introduced into the process chamber via the second gas inlet may flow through the process chamber substantially parallel to the surface of the carrier and thus the surface of the raw material powder layer applied onto the carrier from the side wall of the process chamber wherein the second gas inlet is provided in the direction of a central region of the process chamber. A fresh gas stream supplied to the process chamber via the first gas inlet thus may flow through the process chamber substantially parallel to the surface of the carrier and thus the surface of the raw material powder layer applied onto the carrier in a first direction of flow, whereas a fresh gas stream supplied to the process chamber via the second gas inlet may flow through the process chamber substantially parallel to the surface of the carrier and thus the surface of the raw material powder layer applied onto the carrier in a second direction of flow opposite to the first direction of flow.

The first gas inlet may extend along substantially the entire length of a side edge of the carrier facing the first gas inlet. Similarly, the second gas inlet may extend along substantially the entire length of a side edge of the carrier facing the second gas inlet. This configuration of the gas inlet system ensures that each of the irradiation areas defined on the surface of the carrier is continuously supplied with fresh gas which is not yet loaded with particulate impurities generated upon selectively irradiating electromagnetic or particle radiation onto the raw material powder applied onto the carrier.

If desired or necessary, the gas inlet system also may comprise more than two gas inlets. For example, the gas inlet system may comprise four gas inlets, wherein one gas inlet may be arranged at each one of the four sides of a cuboid-shaped process chamber. Each of the gas inlets may extend along substantially the entire length of a side edge of a square or rectangular carrier. Further, plural gas inlets may be arranged at the same side of the process chamber.

In an alternative embodiment of the method for producing a three-dimensional work piece, fresh gas may be supplied to the process chamber via a gas inlet system comprising a gas inlet arranged above the carrier. Preferably, the gas inlet is arranged above a central region of the carrier. The gas inlet may be arranged in a peripheral surface of a nozzle connected to a gas supply line, thus allowing fresh gas exiting the gas inlet substantially parallel to the surface of the carrier and thus a surface of the raw material powder layer applied onto the carrier. In particular, fresh gas flowing through the gas supply line in a direction substantially perpendicular to the surface of the carrier and thus the surface of the raw material powder layer applied onto the carrier may be deflected in the nozzle about approximately 90° before exiting the gas inlet substantially parallel to the surface of the carrier and thus a surface of the raw material powder layer applied onto the carrier. After exiting the gas inlet, the fresh gas stream may flow through the process chamber substantially parallel to the surface of the carrier and thus the surface of the raw material powder layer applied onto the carrier.

In particular, the fresh gas exiting the gas inlet of the gas inlet system may be distributed radially from the gas inlet in the direction of the side walls of the process chamber so as to ensure that each radiation area defined on the surface of the carrier is overflown with fresh gas which is not yet loaded with particulate impurities generated upon irradiating the raw material powder applied onto the carrier with electromagnetic or particle radiation. The gas inlet may extend around the entire peripheral surface of the nozzle connected to the gas supply line, thus allowing fresh gas exiting the gas inlet to be distributed in the process chamber radially with respect to the gas inlet and substantially parallel to the surface of the carrier and the surface of the raw material powder layer applied onto the carrier.

Gas containing particulate impurities may be discharged from the process chamber via a gas outlet system comprising a gas outlet arranged above the carrier. In particular, the gas outlet of the gas outlet system may be arranged above a central region of the carrier. The gas outlet may be arranged in a peripheral surface of a nozzle connected to a gas discharge line, thus allowing gas containing particulate impurities to enter the gas discharge line substantially parallel to the surface of the carrier and thus a surface of the raw material powder layer applied onto the carrier. Within the nozzle, the gas containing particulate impurities may be deflected about approximately 90° before exiting the process chamber through the gas discharge line in a direction substantially perpendicular to the surface of the carrier and thus the surface of the raw material powder layer applied onto the carrier.

A gas outlet system comprising a gas outlet arranged above the carrier preferably is combined with a gas inlet system comprising a first gas inlet and a second gas inlet arranged at opposing sides of the process chamber. Fresh gas supplied to the process chamber via the first and the second gas inlet then may be directed into the process chamber and flow substantially parallel to the surface of the carrier and the surface of the raw material powder layer applied onto the carrier from the side wall of the process chamber wherein the respective gas inlet is provided in the direction of the central region of the process chamber, i.e. in the direction of the gas outlet. Upon flowing across the surface of the raw material powder layer which is irradiated with electromagnetic or particle radiation, the gas is increasingly loaded with particulate impurities, and, after having overflown an irradiation area defined on the surface of the carrier, is discharged as gas containing particulate impurities via the gas outlet.

Alternatively, gas containing particulate impurities may be discharged from the process chamber via a gas outlet system comprising a first gas outlet and a second gas outlet. The first and the second gas outlet may be arranged at opposing sides, i.e. in opposing side walls of the process chamber. The first gas outlet may extend along substantially the entire length of a side edge of the carrier facing the first gas outlet. Similarly, the second gas outlet may extend along substantially the entire length of a side edge of the carrier facing the second gas outlet. A gas outlet system comprising a first gas outlet and a second gas outlet arranged at opposing sides of the process chamber in particular may be combined with a gas inlet system comprising a gas inlet arranged above the carrier, in particular above a central region of the carrier.

Fresh gas supplied to the process chamber then may be directed from the gas inlet substantially parallel to a surface of the raw material powder layer applied onto the carrier towards the first and the second gas outlet arranged at opposing sides of the process chamber. If desired or necessary, the gas outlet system may comprise more than two gas outlets. For example, the gas outlet system may comprise four gas outlets such that a gas outlet may be provided at each side of a cuboid-shaped process chamber. Further, more than one gas outlet may be arranged at one side of the process chamber so as to discharge gas containing particulate impurities from the process chamber.

Finally, gas containing particulate impurities also may be discharged from the process chamber via a gas outlet system comprising at least one gas outlet formed in the surface of the carrier. A gas outlet system comprising at least one gas outlet formed in the surface of the carrier allows gas containing particulate impurities to be discharged from the process chamber through the carrier. The gas hence is loaded with particulate impurities upon flowing through the raw material powder applied onto the carrier, in particular in a direction substantially perpendicular to a surface of the raw material powder layer applied onto the carrier. Preferably, plural gas outlets are formed in the surface of the carrier, the plural gas outlet preferably being distributed across the surface of the carrier so as to ensure a continuous discharge of gas containing particulate impurities from the process chamber.

A gas outlet system comprising at least one gas outlet formed in the surface of the carrier may be combined with a gas inlet system comprising a first gas inlet and a second gas inlet arranged at opposing sides of the process chamber or a gas inlet system comprising a gas inlet arranged above the carrier. Further, a gas outlet system comprising at least one gas outlet formed in the surface of the carrier may be combined with a gas inlet system comprising a plurality of gas inlets which are arranged above the carrier and distributed across the surface of the carrier.

By directing a gas flow through the raw material powder applied onto the surface of the carrier, the raw material powder may be (pre)densified thus promoting the densification of the raw material powder by selective laser melting or laser sintering. However, in case a raw material powder having a high specific density is applied onto the carrier or in case a thick layer of raw material powder is applied onto the carrier, a gas flow may no longer be conveyed through the raw material powder with the necessary flow rate. In this case, the desired gas flow pattern within the process chamber advantageously is generated by means of a gas inlet system and a gas outlet system which allow the gas to flow through the process chamber substantially parallel to a surface of the raw material powder layer applied onto the carrier.

An apparatus for producing a three-dimensional work piece comprises a powder application device for applying a raw material powder onto a carrier accommodated within a process chamber. A plurality of irradiation areas is defined on a surface of the carrier. The apparatus further comprises an irradiation system for selectively irradiating electromagnetic or particle radiation onto the raw material powder applied onto the carrier. The irradiation system comprises a plurality of irradiation units. Each irradiation unit is associated with one of the irradiation areas defined on the surface of the carrier. Further, each irradiation unit is configured to selectively irradiate electromagnetic or particle radiation onto the raw material powder applied onto the associated irradiation area.

Further, the apparatus for producing a three-dimensional work piece comprises a gas inlet system for supplying fresh gas to the process chamber and a gas outlet system for discharging gas containing particulate impurities from the process chamber. The gas inlet system and the gas outlet system are configured to generate a gas flow pattern within the process chamber. The gas flow pattern is configured such that each irradiation area defined on the surface of the carrier is overflown with fresh gas which is supplied to the process chamber via the gas inlet system and which, after having overflown the irradiation area, is discharged from the process chamber as gas containing particulate impurities via the gas outlet system.

Preferably, at least one overlapping area is defined on the surface of the carrier. The irradiation device may be configured such that the overlapping area is selectively irradiated with electromagnetic or particle radiation by at least two irradiation units of the irradiation system.

The gas inlet system may comprise a first gas inlet and a second gas inlet. The first and the second gas inlet may be arranged at opposing sides of the process chamber. The first gas inlet may extend along substantially the entire length of a side edge of the carrier facing the first gas inlet. Similarly, the second gas inlet may extend along substantially the entire length of a side edge of the carrier facing the second gas inlet.

Alternatively, the gas inlet system may comprise a gas inlet arranged above the carrier, in particular above a central region of the carrier.

The gas outlet system may comprise a gas outlet arranged above the carrier, in particular above a central region of the carrier.

Alternatively, the gas outlet system may comprise a first gas outlet and a second gas outlet. The first and the second gas outlet may be arranged at opposing sides of the process chamber. The first gas outlet may extend along substantially the entire length of a side edge of the carrier facing the first gas outlet. Similarly, the second gas outlet may extend along substantially the entire length of a side edge of the carrier facing the second gas outlet.

Finally, the gas outlet system may comprise at least one gas outlet formed in the surface of the carrier.

BRIEF DESCRIPTION OF THE DRAWINGS

Preferred embodiments of the invention in the following are explained in greater detail with reference to the accompanying schematic drawings, in which.

DETAILED DESCRIPTION

Figure 1:
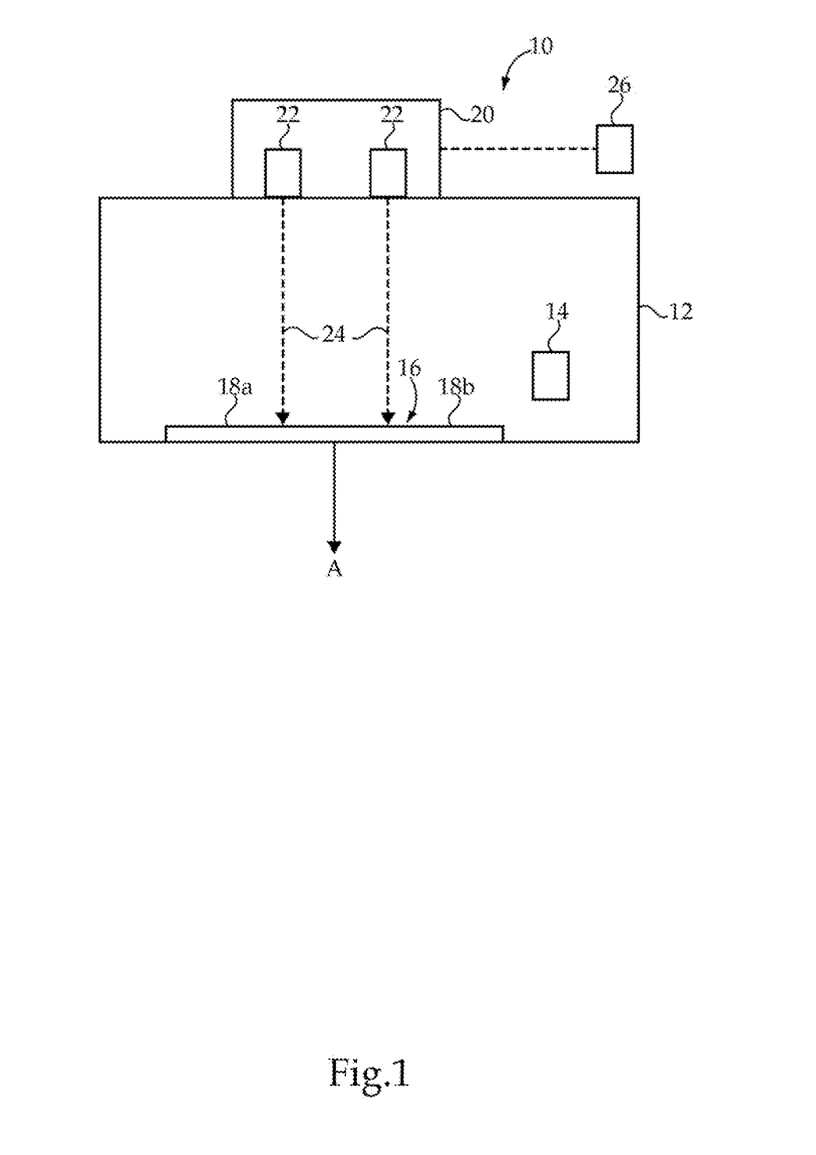
FIG. 1 shows a schematic representation of an apparatus for producing three-dimensional work pieces.

FIG. 1 shows an apparatus 10 for producing three-dimensional work pieces by selective laser melting (SLM®). The apparatus 10 comprises a process chamber 12. A powder application device 14, which is disposed in the process chamber 12, serves to apply a raw material powder onto a carrier 16. As indicated by an arrow A in FIG. 1, the carrier 16 is designed to be displaceable in a vertical direction so that, with increasing construction height of a work piece, as it is built up in layers from the raw material powder on the carrier 16, the carrier 16 can be moved downwards in the vertical direction. As becomes apparent from FIGS. 2 and 3, a plurality of irradiation areas 18a, 18b, 18c, 18d is defined on a surface of the carrier 16. In particular, four irradiation areas 18a, 18b, 18c, 18d which are shaped and arranged so as to form four square quadrants are defined on the surface of the carrier 16.

The apparatus 10 further comprises an irradiation system 20 for selectively irradiating laser radiation onto the raw material powder applied onto the carrier 16. By means of the irradiation system 20, the raw material powder applied onto the carrier 16 may be subjected to laser radiation in a site-selective manner in dependence on the desired geometry of the work piece that is to be produced. The irradiation system 20 comprises a plurality of irradiation units 22 wherein each irradiation unit 22 is associated with one of the irradiation areas 18a, 18b, 18c, 18d defined on the surface of the carrier and is configured to selectively irradiate an electromagnetic or particle radiation beam 24 onto the raw material powder applied onto the associated irradiation area 18a, 18b, 18c, 18d. In the apparatus 10 of FIG. 1, wherein four irradiation areas 18a, 18b, 18c, 18d are defined on the surface of the carrier 16, the irradiation system 20 thus comprises four irradiation units 22 allowing the raw material powder applied onto each one of the irradiation areas 18a, 18b, 18c, 18d to be selectively irradiated with electromagnetic or particle radiation by an associated irradiation unit 22 of the irradiation system 20.

Each irradiation unit 22 may comprise a laser beam source. It is, however, also conceivable that plural irradiation units 22 are associated with a single laser beam source, wherein a radiation beam provided by the single radiation beam source, by suitable means such as, for example, beam splitters and/or mirrors, may be split and/or deflected as required so as to direct the radiation beam provided by the radiation beam source to the associated irradiation units 22. A laser beam source associated with only one irradiation unit 22 or with plural irradiation units 22 may, for example, comprise a diode pumped Ytterbium fibre laser emitting laser light at a wavelength of approximately 1070 to 1080 nm.

Further, each irradiation unit 22 may comprise an optical unit for guiding and/or processing a radiation beam emitted by the radiation beam source and supplied to the irradiation unit 22. The optical unit may comprise a beam expander for expanding the radiation beam, a scanner and an object lens. Alternatively, the optical unit may comprise a beam expander including a focusing optic and a scanner unit. By means of the scanner unit, the position of the focus of the radiation beam both in the direction of the beam path and in a plane perpendicular to the beam path can be changed and adapted. The scanner unit may be designed in the form of a galvanometer scanner and the object lens may be an f-theta object lens. The operation of the irradiation system 20 is controlled by means of a control unit 26.

By means of the control unit 26, each irradiation unit 22 is controlled such that the radiation beam 24 emitted by the irradiation unit 22 is irradiated onto the raw material powder applied onto the irradiation area 18a, 18b, 18c, 18d associated with the irradiation unit 22 in a site selective manner and independent of the irradiation of other irradiation areas 18a, 18b, 18c, 18d not associated with the irradiation unit 22 in question. In other words, each irradiation area 18a, 18b, 18c, 18d defined on the carrier 16 is individually and independently irradiated using a desired irradiation pattern. Thus, a large three-dimensional work piece may be built-up on the carrier 16 in an additive layer construction process within a relatively short time and at reasonable costs by simultaneously irradiating plural irradiation areas 18a, 18b, 18c, 18d defined on the carrier 16 with electromagnetic or particle radiation emitted by the irradiation units 22.

Figure 2:
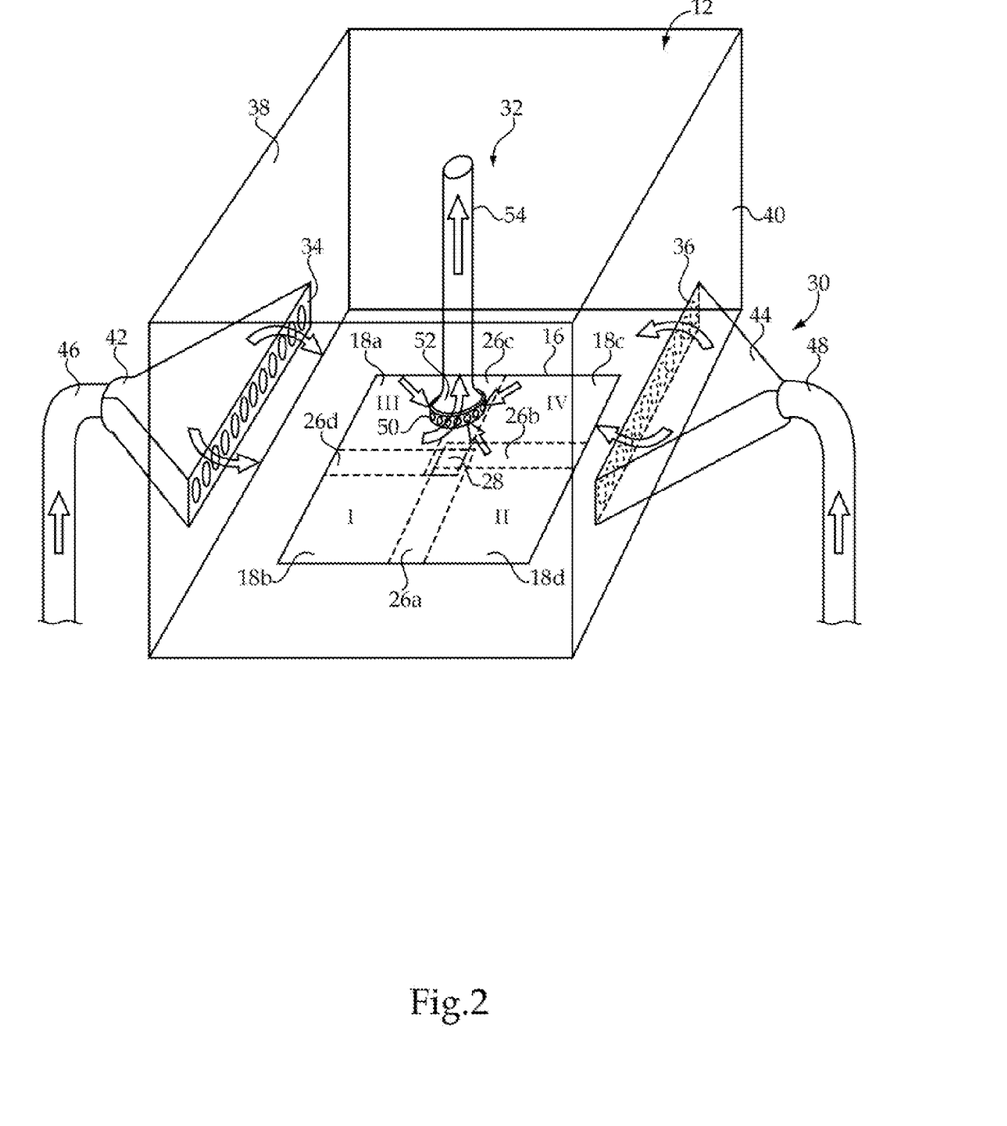
FIG. 2 shows a process chamber of the apparatus according to FIG. 1 which is equipped with a gas inlet system for supplying fresh gas to the process chamber and a gas outlet system for discharging gas containing particulate impurities from the process chamber.
Figure 3:
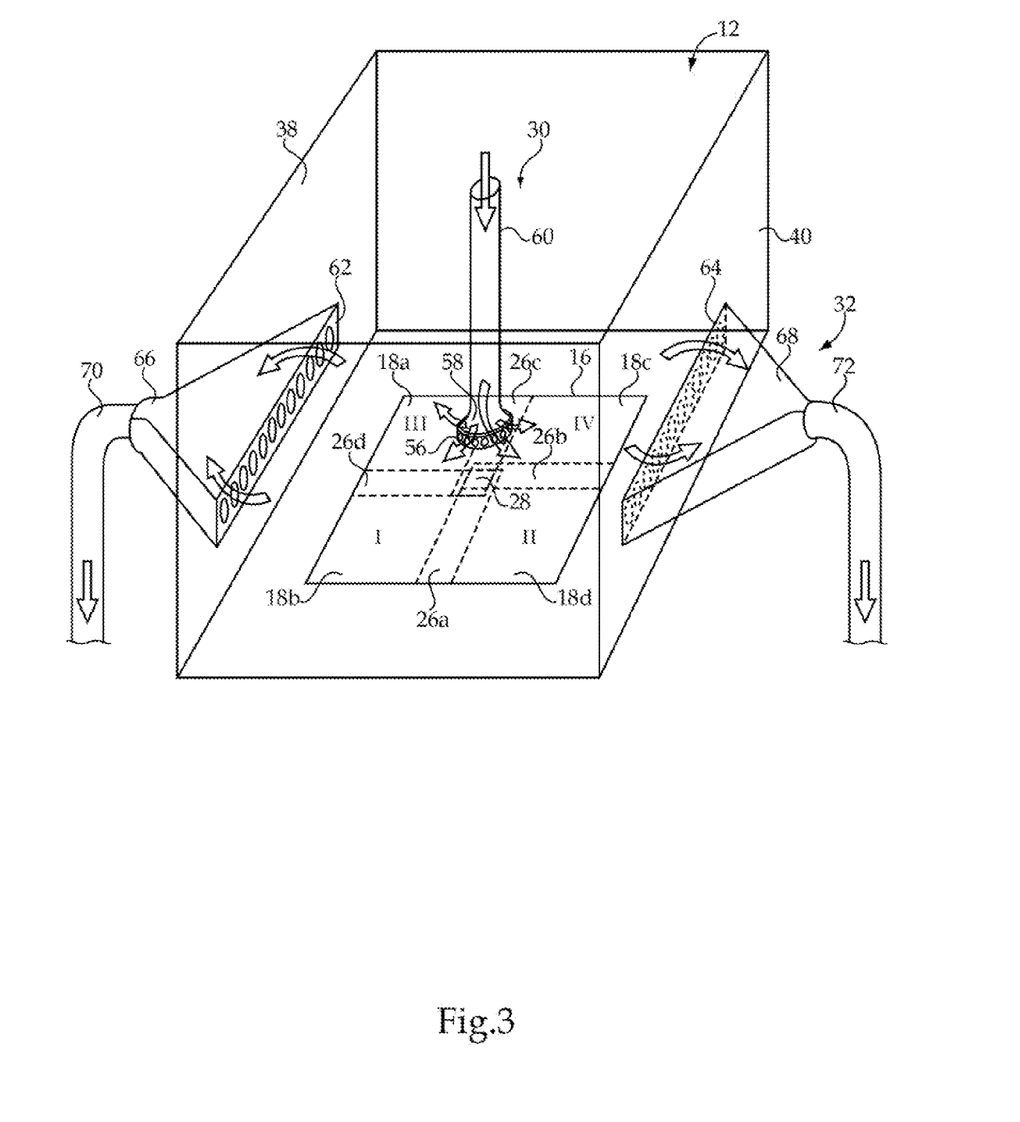
FIG. 3 shows a process chamber of the apparatus according to FIG. 1 which is equipped with an alternative gas inlet system for supplying fresh gas to the process chamber and an alternative gas outlet system for discharging gas containing particulate impurities from the process chamber.

Beside the irradiation areas 18a, 18b, 18c, 18d, four first overlapping areas 26a, 26b, 26c, 26d are defined on the surface of the carrier 16, see FIGS. 2 and 3. Raw material powder applied onto the four first overlapping areas 26a, 26b, 26c, 26d is selectively irradiatable with electromagnetic or particle radiation by two irradiation units 22 of the irradiation system 20. The four first overlapping areas 26a, 26b, 26c, 26d are stripe-shaped and define a cross-pattern on the surface of the carrier 16. Further, a second overlapping area 28 is defined in a central region of the carrier 16 which is selectively irradiatable with electromagnetic or particle radiation by four irradiation units 22 of the irradiation system 20. The overlapping areas 26a, 26b, 26c, 26d, 28 ensure that areas of a large three-dimensional work piece to be built-up on the carrier 16, which are disposed in adjoining regions of adjacent irradiation areas 18a, 18b, 18c, 18d may be generated with the desired reliability and high quality.

The process chamber 12 is sealable against the ambient atmosphere, i.e. against the environment surrounding the process chamber 12. As becomes apparent from FIGS. 2 to 4, fresh gas is supplied to the process chamber 12 by means of a gas inlet system 30. The fresh gas supplied to the process chamber may be an inert gas such as, for example, Argon, Nitrogen or the like. It is however also conceivable to supply the process chamber 12 with air. The fresh gas is supplied to the process chamber 12 by means of a suitable conveying device such as, for example, a pump or a blower (not shown in the drawings).

Figure 4:
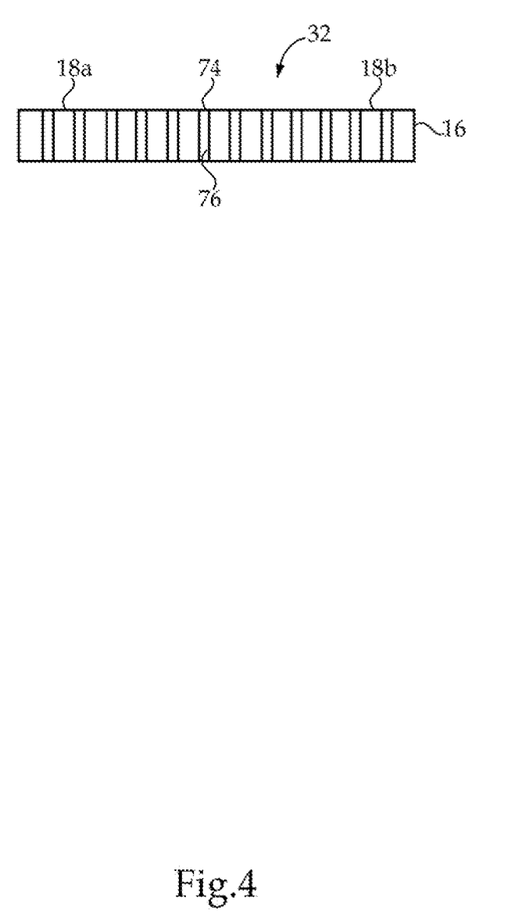
FIG. 4 shows a process chamber of the apparatus according to FIG. 1 which is equipped with a further alternative gas inlet system for supplying fresh gas to the process chamber and a further alternative gas outlet system for discharging gas containing particulate impurities from the process chamber.

Further, gas containing particulate impurities is discharged from the process chamber 12 by means of a gas outlet system 32. While the raw material powder applied onto the carrier 16 is selectively irradiated with electromagnetic or particle radiation, the fresh gas supplied to the process chamber 12 by means of the gas inlet system 30, upon flowing through the process chamber 12, is increasingly loaded with particulate impurities such as, for example, raw material powder particles or welding smoke particles and finally exits the process chamber 12 via the gas outlet system 32 as gas containing particulate impurities. Hence, particulate impurities generated in the process chamber 12 upon irradiating the raw material powder on the carrier 16 with electromagnetic or particle radiation are purged from the process chamber 12 by the gas flow guided through the process chamber 12 by means of the gas inlet system 30 and the gas outlet system 32. The gas containing particulate impurities is discharged from the process chamber 12 by means of a suitable conveying device such as, for example, a pump or a blower (not shown in the drawings).

The gas containing particulate impurities which is discharged from the process chamber 12 via the gas outlet system 32 may be directed through a filter (not shown in the drawings) and, after having passed the filter may be recirculated into the process chamber 12 via the gas inlet system 30.

By the supply of fresh gas to the process chamber 12 and/or the discharge of gas containing particulate impurities from the process chamber 12, a gas flow pattern is generated within the process chamber 12. The gas flow pattern is configured such that each irradiation area 18a, 18b, 18c, 18d defined on the surface of the carrier 16 is overflown with fresh gas which is supplied to the process chamber 12 via the gas inlet system 30 and which, after having overflown the irradiation area 18a, 18b, 18c, 18d, is discharged from the process chamber 12 as gas containing particulate impurities via the gas outlet system 32.

Hence, each irradiation area 18a, 18b, 18c, 18d defined on the surface of the carrier 16 is supplied with fresh gas which, prior to overflowing the irradiation area 18a, 18b, 18c, 18d does not overflow another irradiation area 18a, 18b, 18c, 18d defined on the surface of the carrier 16. Further, gas, after having overflown one of the irradiation areas 18a, 18b, 18c, 18d defined on the surface of the carrier 16 and therefore being loaded with particulate impurities generated upon irradiating the raw material powder applied onto the irradiation area 18a, 18b, 18c, 18d with electromagnetic or particle radiation, is discharged from the process chamber 12 via the gas outlet system 32 without overflowing another irradiation area 18a, 18b, 18c, 18d defined on the surface of the carrier 16. As a result, particulate impurities generated upon irradiating the raw material powder applied onto the carrier 16 with electromagnetic or particle radiation can be reliably removed from each one of the irradiation areas 18a, 18b, 18c, 18d defined on the surface of the carrier 16. Hence, similar process conditions can be realized in all of the irradiation areas 18a, 18b, 18c, 18d. In particular, excessive absorption of radiation energy and/or shielding of the radiation beams 24 emitted by the irradiation units 22 of the irradiation system 20 18a, 18b, 18c, 18d may be avoided in all of the irradiation areas allowing the built-up of a large three-dimensional work piece with a high and consistent quality.

FIGS. 2 to 4 show different embodiments of a gas inlet system 30 and a gas outlet system 32 which may be employed in the apparatus 10 of FIG. 1. In the arrangement of FIG. 2, the gas inlet system 30 comprises a first gas inlet 34 and a second gas inlet 36. The first and the second gas inlet 34, 36 of the gas inlet system 30 are arranged at opposing sides, i.e. in opposing side walls 38, 40 of the process chamber 12. The first gas inlet 34 extends along the entire length of a side edge of the carrier 16 facing the first gas inlet 34. Similarly, the second gas inlet 36 extends along the entire length of a side edge of the carrier 16 facing the second gas inlet 36.

Each of the first and the second gas inlet 34, 36 is connected to a respective funnel-shaped gas distribution member 42, 44 which serves to distribute a fresh gas stream supplied to the first and the second gas inlet 34, 36 via a respective first and second gas supply line 46, 48 over the flow cross sectional surface of the first and the second gas inlet 34, 36. The flow cross sectional surface of the first and the second gas inlet 34, 36 is covered with a baffle plate provided with a plurality of openings allowing gas supplied to the first and the second gas inlet 34, 36 via the respective first and second gas supply line 46, 48 to distributed within the process chamber 12.

The gas outlet system 32 for discharging gas containing particulate impurities from the process chamber 12 comprises a gas outlet 50 arranged above the carrier 16, i.e. above a central region of the carrier 16. Specifically, the gas outlet 50 of the gas outlet system 32 is arranged above the second overlapping area 28 defined on the surface of the carrier 16. The gas outlet 50 is formed in a peripheral surface of a nozzle 52 connected to a gas discharge line 54. In particular, a ring-shaped baffle plate provided with a plurality of openings extends over the entire peripheral surface of the nozzle 52 defining a flow cross sectional surface of the gas outlet 50 and allowing gas containing particulate impurities to exit the process chamber 12. A surface of the nozzle 50 facing the carrier 16 is closed, for example by means of a closure plate.

Thus, the first and the second gas inlet 34, 36 and the gas outlet 50 are provided with a flow cross sectional surface which is oriented substantially perpendicular to the surface of the carrier 16 and thus a surface of the raw material powder layer applied onto the carrier 16. Hence, fresh gas exits the first gas inlet 34 substantially parallel to the surface of the carrier 16 and the surface of the raw material powder layer applied onto the carrier 16 and flows through the process chamber 12 substantially parallel to the surface of the carrier 16 and the surface of the raw material powder layer applied onto the carrier 16 in a direction from the first side wall 38 of the process chamber 12 towards the central region of the process chamber 12. Similarly, fresh gas exits the second gas inlet 36 substantially parallel to the surface of the carrier 16 and the surface of the raw material powder layer applied onto the carrier 16 and flows through the process chamber 12 substantially parallel to the surface of the carrier 16 and the surface of the raw material powder layer applied onto the carrier 16 from the second side wall 40 of the process chamber 12 towards the central region of the process chamber 12.

Fresh gas exiting the first gas inlet 34 overflows one of the irradiation areas 18a, 18b and, after having passed the surface of the raw material powder applied onto the respective irradiation area 18a, 18b and thereby being loaded with particulate impurities, is discharged from the process chamber 12 via the gas outlet 50 without overflowing another one of the irradiation areas 18a, 18b, 18c, 18d. Similarly, fresh gas exiting the second gas inlet 36 overflows one of the irradiation areas 18c, 18d and, after having passed the surface of the raw material powder applied onto the respective irradiation area 18c, 18d and thereby being loaded with particulate impurities, is discharged from the process chamber 12 via the gas outlet 50 without overflowing another one of the irradiation areas 18a, 18b, 18c, 18d. Within the nozzle 52 of the gas outlet 50, the gas containing particulate impurities is deflected about approximately 90° before exiting the process chamber 12 through the gas discharge line 54 in a direction substantially perpendicular to the surface of the carrier 16 and thus the surface of the raw material powder layer applied onto the carrier 16.

The nozzle 52 is designed, i.e. shaped, dimensioned and arranged such that it does not extend into a beam path of a radiation beam emitted by the irradiation system 20, in particular when the radition beam is guided over the raw material powder applied onto the irradiation areas 18a, 18b, 18c, 18d defined on the surface of the carrier 16. With increasing size of the overlapping areas 26a, 26b, 26c, 26d, 28, the distance of the nozzle 52 to the surface of the carrier 16 should also increase in order to avoid the nozzle 52 interfering with the beam path of the radiation beam emitted by the irradiation system 20.

In the alternative arrangement of FIG. 3, the gas inlet system 30 comprises a gas inlet 56 arranged above the carrier 16, i.e. above a central region of the carrier 16. Specifically, the gas inlet 56 of the gas inlet system 30 is arranged above the second overlapping area 28 defined on the surface of the carrier 16. The gas inlet 56 is formed in a peripheral surface of a nozzle 58 connected to a gas supply line 60. In particular, a ring-shaped baffle plate provided with a plurality of openings extends over the entire peripheral surface of the nozzle 58 defining a flow cross sectional surface of the gas inlet 50 and allowing fresh gas to enter the process chamber 12. A surface of the nozzle 58 facing the carrier 16 is closed, for example by means of a closure plate.

Again, the nozzle 58 is designed, i.e. shaped, dimensioned and arranged such that it does not extend into a beam path of a radiation beam emitted by the irradiation system 20, in particular when the radition beam is guided over the raw material powder applied onto the irradiation areas 18a, 18b, 18c, 18d defined on the surface of the carrier 16. With increasing size of the overlapping areas 26a, 26b, 26c, 26d, 28, the distance of the nozzle 58 to the surface of the carrier 16 should also increase in order to avoid the nozzle 58 interfering with the beam path of the radiation beam emitted by the irradiation system 20.

The gas outlet system 32 comprises a first gas outlet 62 and a second gas outlet 64. The first and the second gas outlet 62, 64 of the gas outlet system 32 are arranged at opposing sides, i.e. in opposing side walls 38, 40 of the process chamber 12. The first gas outlet 62 extends along the entire length of a side edge of the carrier 16 facing the first gas outlet 62. Similarly, the second gas outlet 64 extends along the entire length of a side edge of the carrier 16 facing the second gas outlet 64.

Each of the first and the second gas outlet 62, 64 is connected to a respective funnel-shaped gas collection member 66, 68 which serves to collect gas containing particulate impurities which is discharged from the process chamber 12 via the flow cross sectional surface of the first and the second gas outlet 62, 64 and to direct the gas into a respective first and second gas discharge line 70, 72. The flow cross sectional surface of the first and the second gas outlet 62, 64 is covered with a baffle plate provided with a plurality of openings allowing gas containing particulate impurities to exit the process chamber 12 via the first and the second gas outlet 62, 64.

Like in the arrangement of FIG. 2, also in the arrangement according to FIG. 3, the gas inlet 56 and the first and the second gas outlet 62, 64 are provided with a flow cross sectional surface which is oriented substantially perpendicular to the surface of the carrier 16 and thus a surface of the raw material powder layer applied onto the carrier 16. Hence, fresh gas flowing through the gas supply line 60, within the nozzle 58 of the gas inlet 56 is deflected about approximately 90° before being distributed radially from the gas inlet 56 in the direction of the side walls 38, 40 of the process chamber 12. The fresh gas exits the gas inlet 56 substantially parallel to the surface of the carrier 16 and thus the surface of the raw material powder layer applied onto the carrier 16 and flows through the process chamber 12 substantially parallel to the surface of the carrier 16 and thus the surface of the raw material powder layer applied onto the carrier 16.

Fresh gas exiting the gas inlet 56 overflows one of the irradiation areas 18a, 18b, 18c, 18d and, after having passed the surface of the raw material powder applied onto the respective irradiation area 18a, 18b, 18c, 8d and thereby being loaded with particulate impurities, is discharged from the process chamber 12 via either first or the second gas outlet 62, 64 without overflowing another one of the irradiation areas 18a, 18b, 18c, 18d. The gas containing particulate impurities exits the process chamber 12 through the first and the second gas outlet 62, 64 in a direction substantially perpendicular to the surface of the carrier 16 and thus the surface of the raw material powder layer applied onto the carrier 16.

The alternative arrangement of FIG. 4 is equipped with a gas inlet system 30 as described above for the arrangement according to FIG. 2. The gas outlet system 32, however, comprises a plurality of gas outlets 74 formed in the surface of the carrier 16. Each gas outlet 74 is connected to a discharge channel 76 extending through the carrier 16 and being connected to a gas discharge line (not shown in the drawing). The gas outlet system 32 allows gas containing particulate impurities to be discharged from the process chamber 12 through the carrier 16. The gas hence is loaded with particulate impurities upon flowing through the raw material powder applied onto one of the irradiation areas 18a, 18b, 18c, 18d defined on the carrier 16, in particular in a direction substantially perpendicular to the surface of the raw material powder layer applied onto the carrier 16.

The gas outlet system 32 shown in FIG. 4 may also be combined with a gas inlet system 30 comprising a gas inlet 56 as shown in FIG. 3 or with a gas inlet system comprising a plurality of gas inlets which are arranged above the carrier 16 and distributed across the surface of the carrier 16.

The invention claimed is:

1. Method for producing a three-dimensional work piece, the method comprising the steps of:
   applying a layer of raw material powder onto a carrier accommodated within a process chamber by means of a powder application device, wherein a plurality of irradiation areas is defined on a surface of the carrier, and
   selectively irradiating electromagnetic or particle radiation onto the raw material powder applied onto the carrier by means of an irradiation system, the irradiation system comprising a plurality of irradiation units, each irradiation unit being associated with one of the irradiation areas defined on the surface of the carrier and being configured to selectively irradiate electromagnetic or particle radiation onto the raw material powder applied onto the associated irradiation area,
   supplying gas to the process chamber by means of a gas inlet system such that the gas exits the gas inlet system substantially parallel to the surface of the carrier, and
   discharging gas containing particulate impurities from the process chamber by means of a gas outlet system such that a gas flow pattern is generated within the process chamber, the gas flow pattern being configured such that each irradiation area defined on the surface of the carrier is overflown with gas which is supplied to the process chamber via the gas inlet system and which, after having overflown the irradiation area, is discharged from the process chamber as gas containing particulate impurities via the gas outlet system without overflowing another of the plurality of irradiation areas.

2. Method according to claim 1,
   wherein at least one overlapping area is defined on the surface of the carrier, and wherein raw material powder applied onto the overlapping area is selectively irradiatable with electromagnetic or particle radiation by at least two irradiation units of the irradiation system.

3. Method according to claim 1, wherein gas is supplied to the process chamber via a gas inlet system comprising a first gas inlet and a second gas inlet, the first and the second gas inlet being arranged at opposing sides of the process chamber, wherein at least one of the first and the second gas inlet extends along substantially the entire length of a side edge of the carrier facing the at least one of the first and the second gas inlet.

4. Method according to claim 1,
wherein gas is supplied to the process chamber via a gas inlet system comprising a gas inlet arranged above the carrier.

5. Method according to claim 1,
wherein gas containing particulate impurities is discharged from the process chamber via a gas outlet system comprising a gas outlet arranged above of the carrier.

6. Method according to claim 1,
wherein gas containing particulate impurities is discharged from the process chamber via a gas outlet system comprising a first gas outlet and a second gas outlet, the first and the second gas outlet being arranged at opposing sides of the process chamber, wherein at least one of the first and the second gas outlet extends along substantially the entire length of a side edge of the carrier facing the at least one of the first and the second gas outlet.

7. Method according to claim 1,
wherein gas containing particulate impurities is discharged from the process chamber via a gas outlet system comprising at least one gas outlet formed in the surface of the carrier.

8. Apparatus for producing a three-dimensional work piece, comprising:
a powder application device for applying a raw material powder onto a carrier accommodated within a process chamber, wherein a plurality of irradiation areas is defined on a surface of the carrier, and
an irradiation system for selectively irradiating electromagnetic or particle radiation onto the raw material powder applied onto the carrier, the irradiation system comprising a plurality of irradiation units, each irradiation unit being associated with one of the irradiation areas defined on the surface of the carrier and being configured to selectively irradiate electromagnetic or particle radiation onto the raw material powder applied onto the associated irradiation area,
a gas inlet system for supplying fresh gas to the process chamber such that the gas exits the gas inlet system substantially parallel to the surface of the carrier, and
a gas outlet system for discharging gas containing particulate impurities from the process chamber, the gas inlet system and the gas outlet system being configured to generate a gas flow pattern within the process chamber, the gas flow pattern being configured such that each irradiation area defined on the surface of the carrier is overflown with fresh gas which is supplied to the process chamber via the gas inlet system and which, after having overflown the irradiation area is discharged from the process chamber as gas containing particulate impurities via the gas outlet system without overflowing the other plurality of irradiation areas.

9. Apparatus according to claim 8,
wherein at least one overlapping area is defined on the surface of the carrier, and wherein the irradiation system is configured such that the overlapping area is selectively irradiated with electromagnetic or particle radiation by at least two irradiation units of the irradiation system.

10. Apparatus according to claim 8,
wherein the gas inlet system comprises a first gas inlet and a second gas inlet, the first and the second gas inlet being arranged at opposing sides of the process chamber, wherein at least one of the first and the second gas inlet extends along substantially the entire length of a side edge of the carrier facing the at least one of the first and the second gas inlet.

11. Apparatus according to claim 8,
wherein the gas inlet system comprises a gas inlet arranged above the carrier.

12. Apparatus according to claim 8,
wherein the gas outlet system comprises a gas outlet arranged above of the carrier.

13. Apparatus according to claim 8,
wherein the gas outlet system comprises a first gas outlet and a second gas outlet, the first and the second gas outlet being arranged at opposing sides of the process chamber, wherein at least one of the first and the second gas outlet extends along substantially the entire length of a side edge of the carrier facing the at least one of the first and the second gas outlet.

14. Apparatus according to claim 8,
wherein the gas outlet system comprises at least one gas outlet formed in the surface of the carrier.

* * * * *